United States Patent
Shin

(10) Patent No.: US 7,103,373 B2
(45) Date of Patent: *Sep. 5, 2006

(54) METHOD OF PROCESSING DATA USED IN WIRELESS APPLICATIONS USING UNSTRUCTURED SUPPLEMENTARY SERVICE DATA (USSD) AND COMPUTER READABLE MEDIUM THEREFOR

(75) Inventor: Hyun-jung Shin, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 36 days.

This patent is subject to a terminal disclaimer.

(21) Appl. No.: 10/793,757

(22) Filed: Mar. 8, 2004

(65) Prior Publication Data

US 2004/0171395 A1   Sep. 2, 2004

Related U.S. Application Data

(63) Continuation of application No. 09/616,376, filed on Jul. 13, 2000, now Pat. No. 6,771,975.

(30) Foreign Application Priority Data

Oct. 30, 1999   (KR) .............................. 1999-47756

(51) Int. Cl.
*H04Q 7/20* (2006.01)
(52) U.S. Cl. .................. 455/466; 370/466; 455/426.1; 455/352; 455/426.2
(58) Field of Classification Search ............ 455/466, 455/426; 370/466, 392, 417, 328, 338, 345, 370/349, 352, 389, 329, 401, 465, 467, 468, 370/469; 709/320, 250, 219, 233, 230
See application file for complete search history.

(56) References Cited

U.S. PATENT DOCUMENTS

| 6,424,841 B1* | 7/2002 | Gustafsson | 455/466 |
| 6,771,975 B1* | 8/2004 | Shin | 455/466 |
| 2002/0163938 A1* | 11/2002 | Tuomainen et al. | 370/468 |

* cited by examiner

*Primary Examiner*—Melody Mehrpour
*Assistant Examiner*—Naghmeh Mehrpour
(74) *Attorney, Agent, or Firm*—Sughrue Mion, PLLC

(57) ABSTRACT

A method for processing data, in a wireless application protocol for wireless applications using Unstructured Supplementary Service Data (USSD), includes the steps of: (a) receiving data from an upper layer into a Wireless Datagram Protocol (WDP) layer; (b) storing the data received in the WDP layer in step (a) in a common buffer which is commonly used by the WDP layer and a USSD Dialogue Control Protocol (UDCP) layer; and (c) forming packets in the UDCP layer using the data stored in the common buffer in step (b), and then transmitting the packets through the USSD. According to the method, memories for the WDP layer and the UDCP layer, which is an adaptation layer for a Global System for Mobile communication (GSM) USSD bearer, are integrated into one, effectively reducing a required memory size compared to conventional methods in which the WDP layer and the UDCP layer use separate memories.

5 Claims, 4 Drawing Sheets

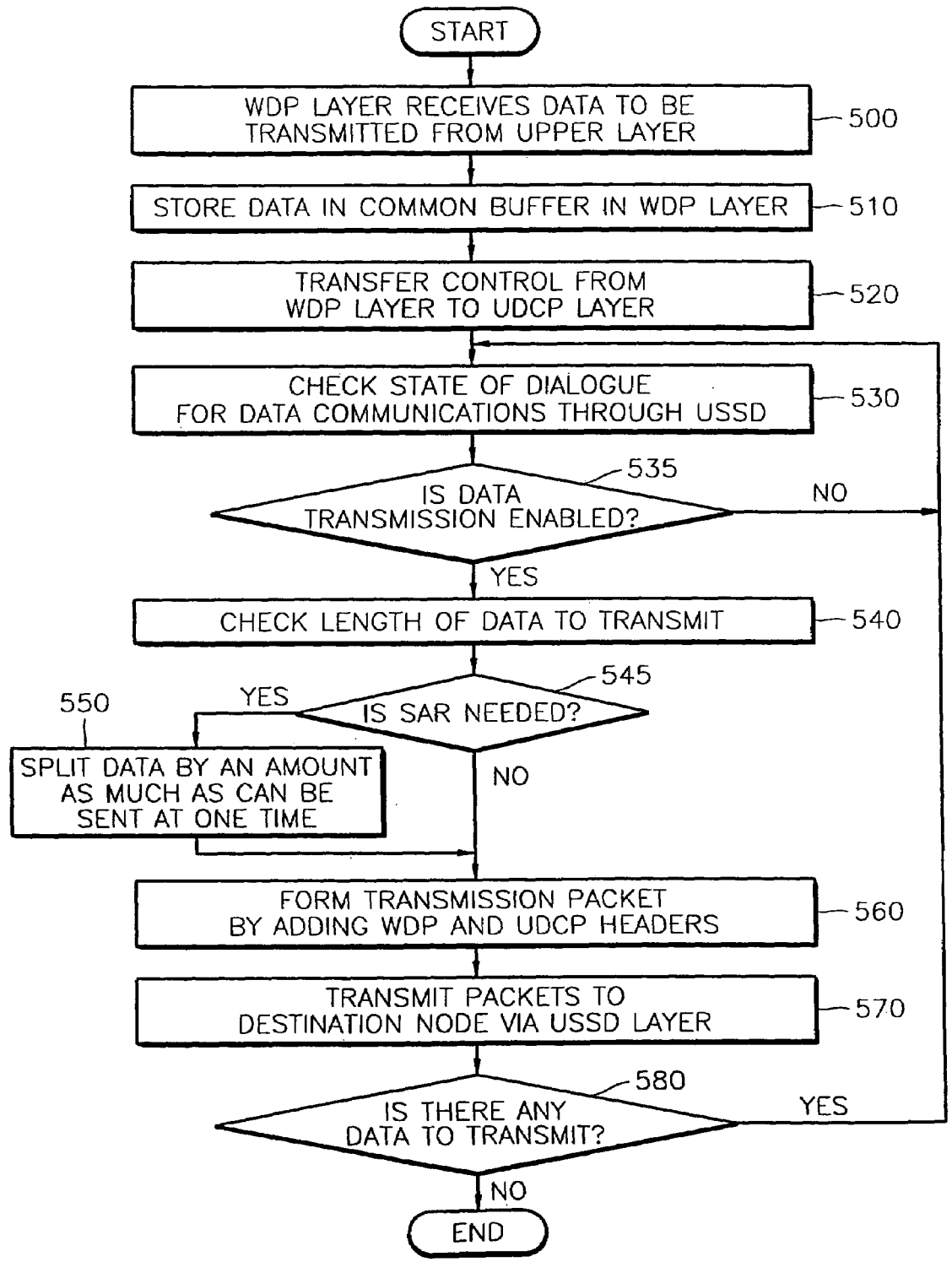

METHOD OF PROCESSING DATA USED IN WIRELESS APPLICATIONS USING UNSTRUCTURED SUPPLEMENTARY SERVICE DATA (USSD) AND COMPUTER READABLE MEDIUM THEREFOR

CROSS-REFERENCE TO RELATED APPLICATIONS

This is a continuation of U.S. application Ser. No. 09/616,376, filed Jul. 13, 2000 now U.S. Pat. No. 6,771,975, the above noted prior applications are all hereby incorporated by reference.

BACKGROUND OF THE INVENTION

1. Field of the Invention

The present invention relates to a wireless application protocol, and more particularly, to a method of processing data to transmit in a wireless application protocol for wireless applications using Unstructured Supplementary Service Data (USSD).

2. Description of the Related Art

The worldwide market for mobile telecommunication terminals, which provide convenient communication, is rapidly expanding. The technological era of mobile telecommunication terminals which began with analogue cellular phones has seen the introduction of digital cellular phones, and now, personal communications services (PCS) phones. In line with the development of mobile telecommunications technologies, it has become possible to access data networks such as the Internet via a mobile telecommunications terminal. Accordingly, diverse wireless application services, such as Internet content services and voice services are now being offered by mobile telecommunications networks.

Due to the characteristics of devices, however, mobile telecommunications terminals have many limitations in available resources, for example due to power supply capacity, the size and visibility of a display, transmission rate, and capacities of a processor and a memory. Therefore, compared to a protocol supporting access to the Internet via a computer for using web services, protocols supporting use of diverse wireless application services from a mobile telecommunications terminal are designed in relatively simple form, considering the limited resources of the mobile telecommunications terminal.

Among protocols which have been standardized or are being standardized in order to support the use of wireless application services via a mobile telecommunications terminal, one of the leading protocols is Wireless Application Protocol (WAP) proposed by WAP Forum.

WAP has a configuration similar to that of the protocol used for computers. For example, WAP uses a Wireless Markup Language (WML) in the presentation layer, a substitution for a HyperText Markup Language (HTML), and a Wireless Session Protocol (WSP) in the session layer, similar to a HyperText Transfer Protocol (HTTP). WAP uses a Wireless Transport Protocol (WTP) which is an integration of a Transport Control Protocol (TCP) and an Internet Protocol (IP), or a Wireless Datagram Protocol (WDP) which is an integration of a User Datagram Protocol (UDP) and the IP, in its transport and network layer.

Contrary to other bearers applied to the WAP, however, if the Global System for Mobile Communication (GSM) USSD is used as a lower bearer, the WAP must include an additional layer. That is, a USSD Dialogue Control Protocol (UDCP) layer is used as a WAP adaptation layer. FIG. 1 is a schematic diagram showing the protocol stack of the WAP 100 when the GSM USSD is used as a lower bearer.

Included in FIG. 1 is a Wireless Application Environment (WAE) layer 110, which provides an integrated wireless application environment independent of the kinds of network or lower bearer. The WAE includes a WML which is a display language, a WML script which is a script language, and a Wireless Telephone services application program interface and Architecture (WTA) which is an application program interface for call services. A WSP layer 120 provides session services to upper layers and is primarily based on the HTTP.

A WTP layer 130, which is a transport layer for wireless application services, plays the roles of existing TCP(UDP)/IP and Point-to-Point Protocol (PPP) to ensure independency of the kinds of underlying network. The WDP layer 140 is a kind of WTP using a datagram (also called WTP/D), and provides a connection-less, unreliable data service method.

A UDCP layer 150 is an adaptation layer used to control an additional USSD dialogue for a lower GSM USSD 160 bearer. The USSD layer 160 supports transmission of text between mobile telecommunications terminals through wireless telecommunications networks, and is used for a variety of supplementary services which are not defined in the GSM specification.

The GSM specification is one of the standard specifications for wireless communications in digital cellular mobile telecommunications networks. The GSM specification is based on a Time Division Multiple Access (TDMA) technique, and is mainly used in the U.S. and European countries. Meanwhile, mobile telecommunications services in Korea are provided through a Code Division Multiple Access (CDMA) technique instead of the GSM.

The packet structure in each layer will now be described by focusing on the WDP and UDCP layers. FIG. 2 is a schematic diagram showing the packet structure, that is, a Protocol Data Unit (PDU), in the WDP and UDCP layers in WAP's protocol stack for the GSM USSD of FIG. 1.

As illustrated in FIG. 2, user data 200 in an upper layer, for example the WSP layer, is encapsulated without any change into a data field 200a in a PDU 210 of the WDP layer, and then added to a WDP header which is an information element (IE) having information about the user data field 200a, forming an entire PDU 210 of the WDP layer. In FIG. 2, the IE includes an IE_PORT field 212 which has information on a port, which is an access point to the WDP layer from the upper layer, and an IE_SAR field 214 which has information on Segmentation And Reassembly (SAR).

SAR is a technique of segmenting the data received from an upper layer and then forwarding the segmented data, or reassembling received segmented data and then passing the reassembled data to an upper layer when the size of data that can be transmitted through a lower telecommunications network is limited.

Next, the PDU 210 of the WDP layer is encapsulated unchanged into a user data field 210a in the PDU 220 of the UDCP layer, and then a UDCP header is added thereto to form a UDCP PDU 220. The UDCP header includes an IE_UDCP field 226 which has dialogue control information, an UDH_LEN field 224 which has information on the length of a user data header, and a TOT_LEN field 222 which has information on the length of the UDCP PDU 220 in the UDCP layer. In FIG. 2, the user data header includes the IE_UDCP field 226, and the IE_PORT field 212 and the IE_SAR field 214 which are included in the WDP layer.

The protocol operation in the WDP and UDCP layers according to the conventional WAP will now be described focusing on the aspect of memory management. FIG. 3 is a schematic diagram showing the protocol operation in WDP and UDCP layers in wireless application protocols for wireless application services using the existing USSD, from the viewpoint of memory management.

As illustrated in FIG. 3, when user data 301 and 302 of an upper layer passed down to the WDP layer along the WAP protocol stack, the WDP layer sequentially stores data 301a and 302a in a WDP buffer 310, adds WDP headers to the user data, and then passes data with headers, 311 and 312, to the UDCP layer. If the size of the user data 301a and 302a stored in the WDP buffer 310 is bigger than that of a transmission unit of the lower telecommunication network USSD, the WDP layer adds a WDP header to each segment after carrying out the SAR.

The UDCP layer sequentially stores the data 311 and 312 transferred from the WDP layer in a UDCP buffer 320 and transmits the data 321 and 322, to which the UDCP headers have been added, from storage in a UDCP buffer 320 through the USSD layer to a destination node at an appropriate point in time, that is, when a dialogue control is set up.

Because the WAP is a protocol that supports wireless application services using a mobile telecommunications terminal, the WAP needs to be designed to minimize memory use in consideration of limited resources of the mobile telecommunication terminal.

In conventional methods, however, when a lower bearer is the USSD, additional memory is needed in the UDCP layer in addition to that of the WDP layer, because of a separate UDCP adaptation layer for the USSD dialogue control. Particularly when the SAR is performed, WDP and UDCP layers assign memory to each segment. Therefore, in this way memory is wasted, which lowers resource efficiency of a mobile telecommunications terminal having limited resources.

Furthermore, as WDP and UDCP layers manage their respective buffers, the memory management becomes complicated, and with duplicated buffer management routines, the length of program code in a mobile telecommunications terminal becomes longer.

SUMMARY OF THE INVENTION

To solve the above problems, it is an objective of the present invention to provide a method, for processing data for wireless applications using Unstructured Supplementary Service Data (USSD), in which a memory of a Wireless Datagram Protocol (WDP) and of a USSD Dialogue Control Protocol (UDCP) layer, that is, an adaptation layer for the USSD bearer, are integrated into one to increase the efficiency of the limited resources in a mobile telecommunications terminal and of a computer readable medium storing a program therefor.

According to a first embodiment of the present invention, there is provided a method, for processing data for wireless applications using Unstructured Supplementary Service Data (USSD), which has the steps of: (a) receiving transmission data from an upper layer in a Wireless Datagram Protocol (WDP) layer; (b) storing the data received in the step (a) in a common buffer, where the common buffer is commonly used by the WDP layer and a USSD Dialogue Control Protocol (UDCP) layer; and (c) forming a transmission packet using the data stored in the common buffer in the UDCP layer and then transmitting the packet through the USSD.

According to a second embodiment of the present invention, there is provided a method, for processing data for wireless applications using Unstructured Supplementary Service Data (USSD), which has the steps of: (a) checking in a USSD Dialogue Control Protocol (UDCP) layer the state of a dialogue for data communications through the USSD with a destination node when data for transmitting through the USSD is stored in a common buffer commonly used by a Wireless Datagram Protocol (WDP) layer and the UDCP layer; (b) reading the data stored in the common buffer if, in the step (a), the state of dialogue is verified to be a state in which the transmission of data can be performed, and then forming a packet; and (c) transmitting the packet formed in the step (b) through the USSD to a destination node.

According to a third embodiment of the present invention, there is provided a method, for processing data for wireless applications using Unstructured Supplementary Service Data (USSD), which has the steps of: (a) receiving transmission data from an upper layer in a Wireless Datagram Protocol (WDP) layer; (b) storing the data received in the step (a) in a common buffer commonly used by the WDP layer and a USSD Dialogue Control Protocol (UDCP) layer, and then transferring control to the UDCP layer; (c) reading the data stored in the common buffer if dialogue is in a state in which the transmission of data can be performed, when checking in the UDCP layer a dialogue state for data communications through the USSD with a destination node, and then forming a packet; and (d) transmitting the packet formed in the step (c) through the USSD.

Preferably in the step (c), WDP and UDCP headers are added to the data read from the common buffer to form the packet.

Preferably in the step (c), an amount of data equal to the size of a USSD transmission unit, which is the size of the user data which can be transmitted in a packet through the USSD excluding the WDP header and the UDCP header, is extracted from the data stored in the common buffer to form a packet if the size of the data stored in the common buffer is bigger than a USSD transmission unit.

According to a fourth embodiment of the present invention, there is provided on a computer readable medium a recorded program which can be executed in a computer for processing data for wireless applications using Unstructured Supplementary Service Data (USSD), the program having the steps of: (a) receiving transmission data from a layer above the Wireless Datagram Protocol (WDP) layer; (b) storing the data received in the step (a) into a common buffer commonly used by the WDP layer and a USSD Dialogue Control Protocol (UDCP) layer; and (c) forming a transmission packet using the data stored in the common buffer and then transmitting the packets through the USSD.

According to a fifth embodiment of the present invention, there is provided on a computer readable medium a recorded program which can be executed in a computer for processing data for wireless applications using Unstructured Supplementary Service Data (USSD), the program having the steps of: (a) checking the state of a dialogue for data communications through the USSD with a destination node when data to be transmitted through the USSD is stored in a common buffer commonly used by a Wireless Datagram Protocol (WDP) layer and the UDCP layer; (b) reading the data stored in the common buffer if, in the step (a), the state of the dialogue is verified to be a state in which the transmission of data can be performed, and then forming a packet; and (c) transmitting the packet formed in the step (b) through the USSD to a destination node.

According to a sixth embodiment of the present invention, there is provided on a computer readable medium a recorded program which can be executed in a computer for processing data for wireless applications using the Unstructured Supplementary Service Data (USSD), the program having the steps of: (a) receiving transmission data from a layer above the Wireless Datagram Protocol (WDP) layer; (b) storing the data received in the step (a) into a common buffer, in which the common buffer is commonly used by the WDP layer and a USSD Dialogue Control Protocol (UDCP) layer; (c) reading the data stored in the common buffer if the dialogue is in a state in which transmission of data can be performed for data communications through the USSD with a destination node, and then forming a packet; and (d) transmitting the packet formed in the step (c) through the USSD.

Preferably in the step (c), WDP and UDCP headers are added to the data read from the common buffer to form the packet.

Preferably in the step (c), an amount of data equal to the size of a USSD transmission unit, which is the size of the user data which can be transmitted in a packet through the USSD excluding the WDP header and the UDCP header, is extracted from the data stored in the common buffer to form a packet if the size of the data stored in the common buffer is bigger than a USSD transmission unit.

BRIEF DESCRIPTION OF THE DRAWINGS

The above objectives and advantages of the present invention will become more apparent by describing in detail a preferred embodiment thereof with reference to the attached drawings in which:

FIG. 5 is a flowchart of a method of processing data used in wireless applications using the USSD according to an embodiment of the present invention.

DETAILED DESCRIPTION OF THE INVENTION

The structure and operation of desirable examples of the present invention will now be described with reference to the accompanying drawings.

Figure 1:
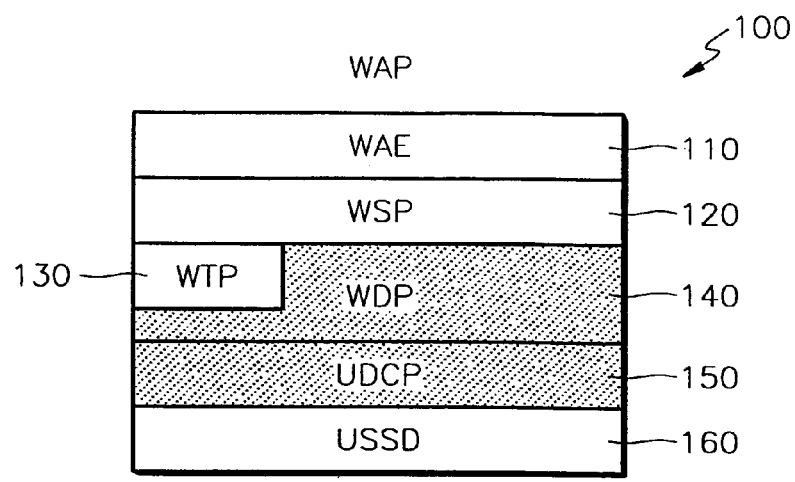
FIG. 1 is a schematic diagram of a Wireless Application Protocol (WAP) stack when Global System for Mobile Communication (GSM) Unstructured Supplementary Service Data (USSD) is used as a lower bearer.
Figure 2:
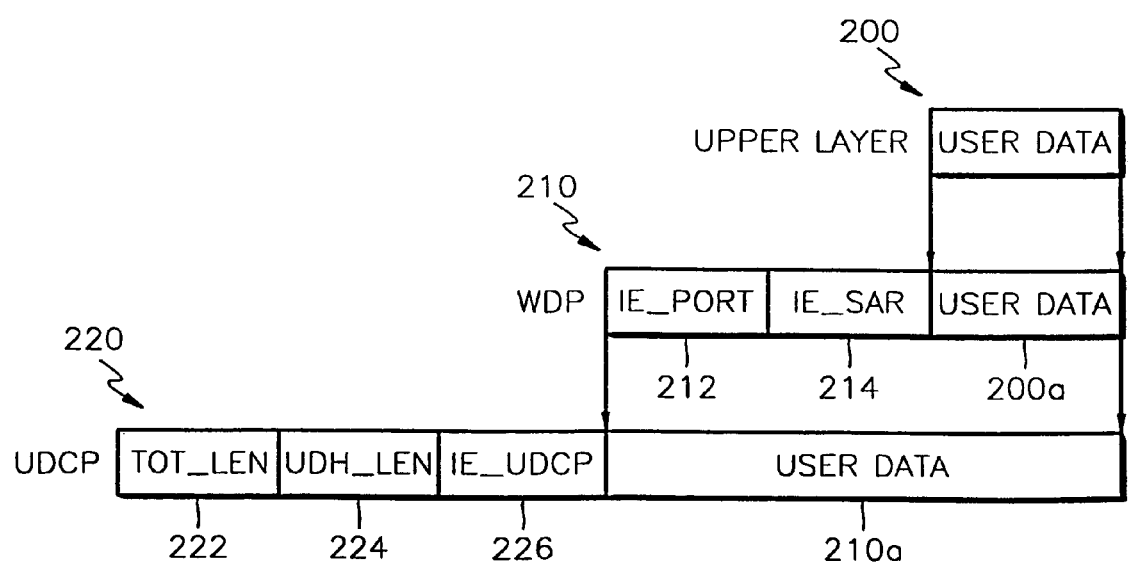
FIG. 2 is a schematic diagram of packet structures in Wireless Datagram Protocol (WDP) and USSD Dialogue Control Protocol (UDCP) layers.
Figure 3:
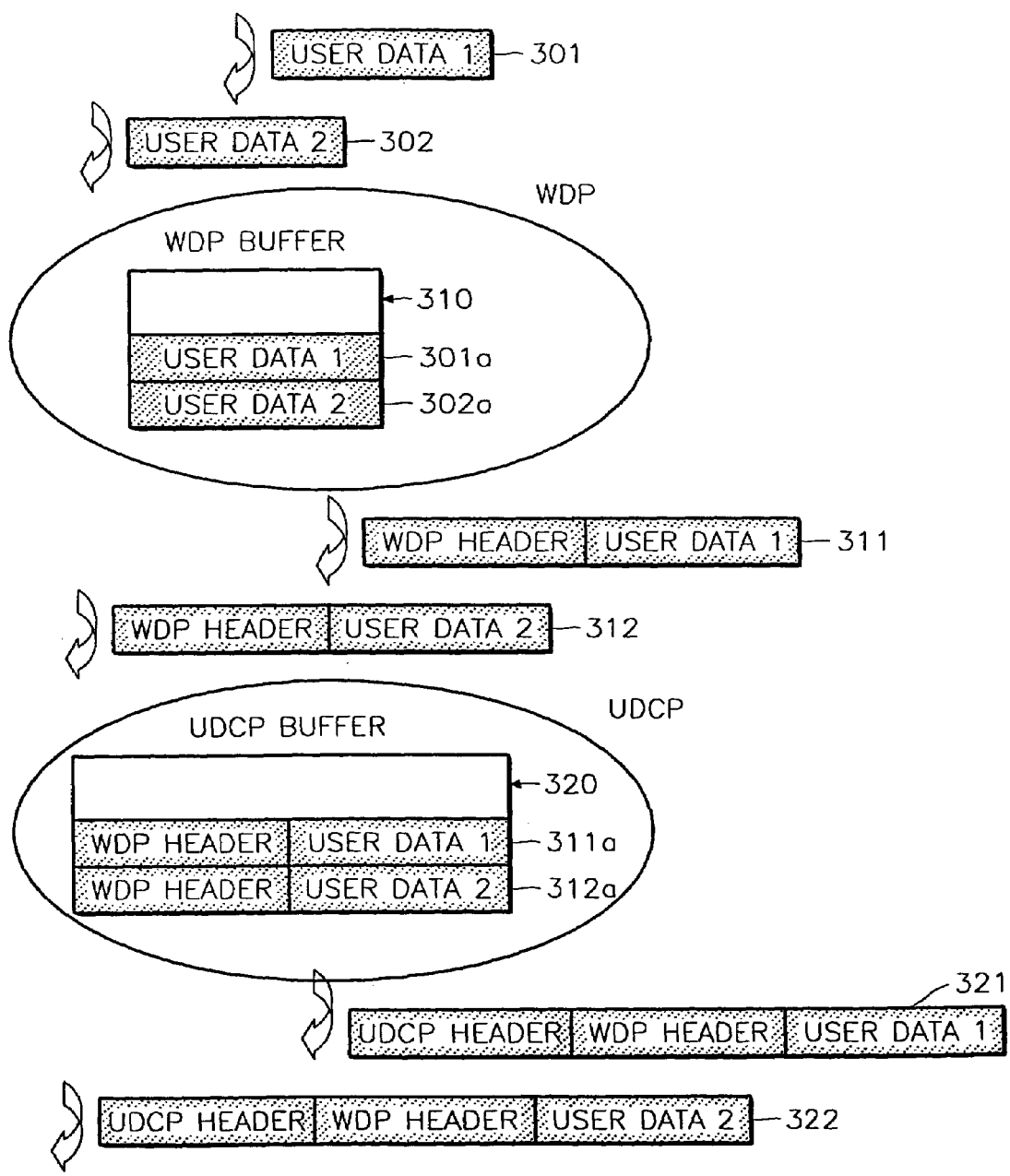
FIG. 3 is a schematic diagram showing a conventional protocol operation in WDP and UDCP layers from the viewpoint of memory management.
Figure 4:
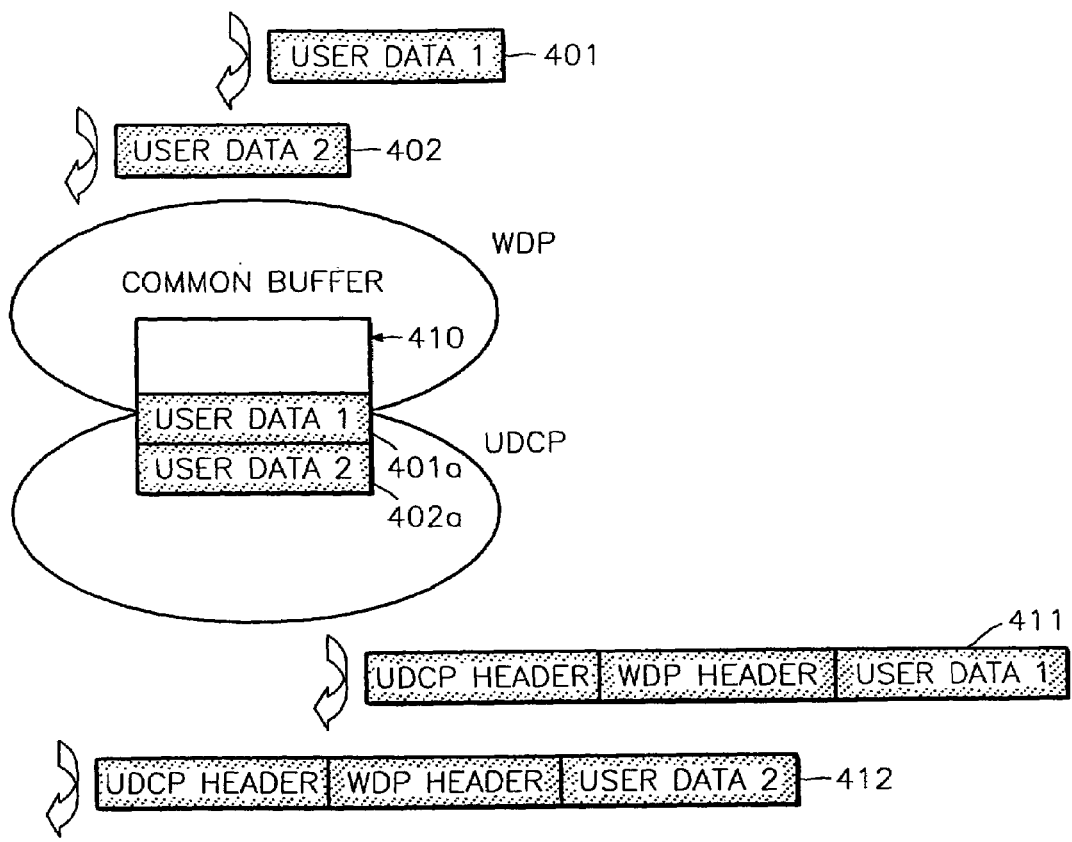
FIG. 4 is a schematic diagram showing a protocol operation in WDP and UDCP layers according to an embodiment of the present invention from the viewpoint of memory management.

FIG. 4 is a schematic diagram showing a protocol operation in a Wireless Datagram Protocol (WDP) layer and a USSD Dialogue Control Protocol (UDCP) layer according an embodiment of the present invention from the viewpoint of memory management.

As illustrated in FIG. 4, contrary to conventional methods that use separate buffers in the WDP and UDCP layers, the present example uses only one common buffer 410 which is shared between the WDP and UDCP layers. The WDP layer stores user data 401 and 402 of an upper layer, which were passed unchanged (without adding WDP headers) down along the Wireless Application Protocol (WAP) protocol stack into the common buffer 410, and then transfers control to the UDCP layer.

Then, the UDCP layer starts a dialogue to communicate with a destination node through the Unstructured Supplementary Service Data (USSD). In order to transmit and receive data through the USSD, a dialogue needs to be effectuated with the destination node. That is, the source node waits for a response from the destination node after transmitting data with a request for starting a dialogue. When it receives a response from the destination node, the source node transmits the next data. The UDCP operates in this manner and therefore, the UDCP layer needs a buffer in which data are waiting their turn for transmission according to a dialogue state. The present embodiment operates so that a buffer that is essential to the UDCP layer is commonly used by the WDP layer.

If a data transmission is enabled and the dialogue is in a particular state for data communications with a destination node through the USSD, the UDCP layer reads the data 401a and 402a from the common buffer 410, forms transmission packets 411 and 412, and then transmits the packets to the destination node through the USSD layer. In order to form packets to transmit to the destination node, the memory for the transmission packets needs to be newly assigned.

A process for forming packets to transmit will now be described in detail. First, the UDCP layer determines whether the data 401a and 401a stored in the common buffer needs Segmentation And Reassembly (SAR). Currently, the USSD bearer can transmit a packet having a size of up to 160 bytes. Therefore, any of the data 401a and 401a with a size bigger than 160 bytes must be segmented. The 160 byte size is based on the whole data length including the length of the WDP header and the UDCP header. Therefore, if the size of the header-less user data is greater than the length value of 160 bytes minus the byte length of WDP and UDCP headers (hereinafter referred as a net data transmission unit), then the UDCP layer segments the data by a net data transmission unit.

If the SAR is not needed, the UDCP layer reads the data 401a and 402b from the common buffer 410 and forms packets by directly adding WDP and UDCP headers to the data 401a and 402b. If the SAR is needed, the UDCP layer forms packets by adding WDP and UDCP headers to each segment, and then transmits each packet according to the state of a dialogue. However, because only one packet can be transmitted at a time according to the dialogue state, it is desirable for the UDCP layer to read each segment, instead of the whole data, from the common buffer 410 to form a packet to transmit.

As described above, contrary to the conventional methods in which the WDP layer carries out the SAR and adds a WDP header, the present example provides a method in which the UDCP layer carries out the SAR and adds the WDP and UDCP headers to form packets to transmit.

Following the above description of the protocol operation in the WDP and UDCP layers from the viewpoint of memory management, a method for processing data in the WDP and UDCP layers will now be described. FIG. 5 is a flowchart for explaining a method of processing data which is to be transmitted in a wireless application protocol for wireless applications using the USSD according to an embodiment of the present invention.

First, the WDP layer receives data from an upper layer in step 500. The WDP layer stores the received data in the common buffer which is commonly used by the WDP and UDCP layers, in step 510, and transfers control to the UDCP layer in step 520. That is, the WDP layer stores the received data in the common buffer without adding a WDP header, and calls the UDCP layer.

After being informed that there are data to transmit through the USSD, the UDCP layer checks the state of dialogue for data communications through the USSD with a destination node in step 530. That is, the UDCP layer starts a dialogue by transmitting the data if no dialogue is enabled, and checks a dialogue state to verify that transmission can be performed if a dialogue is already set up.

If a dialogue state is not in a state to perform data transmission, the UDCP layer returns to the step 530 and waits until the dialogue state becomes the state to perform data transmission in step 535.

If a dialogue state becomes the state to perform data transmission, the UDCP layer reads data from the common buffer and forms packets.

In order to form packets, first the UDCP layer determines whether the SAR is needed by checking the length of the data in steps 540 and 545. If the SAR is not needed, the UDCP layer fetches the whole data, adds WDP and UDCP headers to the data, and forms a packet to transmit in step 560. But, if the SAR is needed, the UDCP layer reads an amount of data as a transmission unit, that is a segment of the data, and adds WDP and UDCP headers to the segment to form a packet in the steps 550 and 560. In order to form packets to transmit to the destination node, the memory for the transmission packets needs to be newly assigned.

The data or the segment which was formed into a packet in the step 560 is passed to the USSD layer and then transmitted to the destination node in step 570.

Finally, the UDCP layer checks whether there is any data to be transmitted left in the common buffer in step 580 and, if any data to be transmitted is left, the method returns to the step 530 to repeat the process to check the USSD dialogue state for data transmission.

The embodiments of the present invention can be made into programs which can be executed in a computer system. The programs can be read from a computer-readable medium and executed by a general purpose digital computer system. The computer-readable media include storage media such as magnetic storage media (e.g., ROM's, floppy disks, hard disks, etc.), optically readable media (e.g., CD-ROMs, DVDs, etc.) or carrier waves (e.g., transmissions over the Internet).

According to the present invention, a memory of the WDP layer and that of the UDCP layer, which is an adaptation layer for the USSD bearer, are integrated into one, which efficiently reduces the size of memory compared to the conventional methods in which the WDP layer and the UDCP layer use separate memories.

For example, if a WDP header is 20 bytes, a UDCP header is 20 bytes, and 100 bytes of data are passed down from an upper layer, a conventional method needs a 100-byte memory for the WDP buffer, a 120-byte memory for the UDCP buffer (including the data to transmit and the WDP header), and a 140-byte memory for forming a transmission packet at the UDCP layer (including the data, the WDP header, and the UDCP header). Meanwhile, a 100-byte memory for the common buffer of WDP and UDCP layers and a 140-byte memory for forming a transmission packet (including the data to transmit, the WDP header, and UDCP header) are needed according to the present invention.

In addition, according to the present invention, the UDCP layer does not need to newly assign memory when the WDP layer passes the data to transmit to the UDCP layer, but instead accesses the data stored by the WDP layer in the common buffer only when the transmission is actually performed, which increases the efficiency of memory management. Particularly, when the SAR is needed, the UDCP layer needs to manage a separate memory for each segment because the WDP layer carries out the SAR and passes each segment to the UDCP layer in the conventional methods, while the present invention uses the common buffer and forms packets using the transmission data in segmented units only when a time to transmit comes, which increases the efficiency of memory management.

Further, the present invention provides diverse advantages including a reduction in memory size while implementing wireless application protocols, an increase in the efficiency of resources in a mobile telecommunications terminal, and a reduction in the length of program code required in buffer management.

While this invention has been particularly shown and described with reference to preferred embodiments thereof, it will be understood by those skilled in the art that various changes in form and details may be made therein without departing from the spirit and scope of the invention as defined by the appended claims. Therefore, the disclosed embodiments should not be construed as limiting the present invention, but as conveying the concept of the invention to those skilled in the art. The scope of the present invention is not limited by the above detailed description but in the appended claims, and any difference within the equivalent scope will be interpreted as being included in the present invention.

What is claimed is:

1. A method of processing data for wireless Applications using Unstructured Supplementary Service Data (USSD), comprising:
   (a) receiving transmission data from an upper layer in a Wireless Datagram Protocol (WDP) layer;
   (b) storing the received data in a common buffer, the common buffer being commonly used by the WDP layer and a USSD Dialogue Control Protocol (UDCP) layer; and
   (c) forming a transmission packet using the data stored in the common buffer, and then transmitting the packet through the USSD.

2. The method as claimed in claim 1, wherein in operation (c) the UDCP layer forms the packet by adding WDP and UDCP headers to the data stored in the operation (b).

3. The method as claimed in claim 1, wherein in operation (c) the transmission packet is formed in the UDCP layer.

4. A program recorded on a computer readable medium, the program executed in a computer for processing data for wireless Applications using Unstructured Supplementary Service Data (USSD), the program comprising:
   (a) receiving transmission data from a layer above a Wireless Datagram Protocol (WDP) layer;
   (b) storing the received data in a common buffer commonly used by the WDP layer and a USSD Dialogue Control Protocol (UDCP) layer; and
   (c) forming a transmission packet using the data stored in the common buffer, and then transmitting the packet through the USSD.

5. The program recorded on a computer readable medium as claimed in claim 4, wherein in operation (c) the transmission packet is formed in the UDCP layer using the stored common buffer data.

* * * * *